(12) United States Patent
Hertzman et al.

(10) Patent No.: US 10,304,300 B2
(45) Date of Patent: May 28, 2019

(54) CAMERA ARRANGEMENT FOR MOUNTING A DOME OF THE CAMERA ARRANGEMENT TO A CAMERA BASE

(71) Applicant: Axis AB, Lund (SE)

(72) Inventors: Andreas Hertzman, Lund (SE); Stefan Larsson, Lund (SE); Malte Bokvist, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 15/836,222

(22) Filed: Dec. 8, 2017

(65) Prior Publication Data
US 2018/0165930 A1 Jun. 14, 2018

(30) Foreign Application Priority Data

Dec. 9, 2016 (EP) .................................... 16203192
Dec. 4, 2017 (EP) .................................... 17205150

(51) Int. Cl.
*G08B 13/196* (2006.01)
*H04N 5/225* (2006.01)
(Continued)

(52) U.S. Cl.
CPC ....... *G08B 13/19632* (2013.01); *G03B 17/02* (2013.01); *G03B 17/12* (2013.01);
(Continued)

(58) Field of Classification Search
CPC ........ G08B 13/19632; G08B 13/19619; G03B 17/02; G03B 17/561; G03B 17/12;
(Continued)

(56) References Cited

U.S. PATENT DOCUMENTS 4,920,367 A 4/1990 Pagano
6,896,423 B2 5/2005 Arbuckle et al.
(Continued)

FOREIGN PATENT DOCUMENTS

CN    2599395 Y   1/2004
CN    203 517 546 U   4/2014
(Continued)

OTHER PUBLICATIONS

EP 16 20 3192.6 European Search Report (dated Jun. 16, 2017).
EP 17205150.0 Extended European Search Report (dated May 23, 2018).

*Primary Examiner* — Lin Ye
*Assistant Examiner* — Chan T Nugyen
(74) *Attorney, Agent, or Firm* — Volpe and Koenig, P.C

(57) ABSTRACT

A camera arrangement comprising a camera base for mounting the camera arrangement to a surface. The camera base comprises a central receiving portion. The camera arrangement further comprises a dome comprising a central section with a through-going opening; and an attachment device configured to attach the dome to the central receiving portion. The attachment device comprises an attachment portion configured to extend through the through-going opening of the dome and to lockingly engage a complementary attachment portion of the central receiving portion, and an abutment portion configured to abut an outside surface of the dome.

15 Claims, 5 Drawing Sheets

(51) Int. Cl.
    *G03B 17/12*     (2006.01)
    *H04N 5/33*     (2006.01)
    *G03B 17/02*     (2006.01)
    *G03B 17/56*     (2006.01)

(52) U.S. Cl.
    CPC ..... *G03B 17/561* (2013.01); *G08B 13/19619* (2013.01); *H04N 5/2251* (2013.01); *H04N 5/2252* (2013.01); *H04N 5/2253* (2013.01); *H04N 5/2254* (2013.01); *H04N 5/2256* (2013.01); *H04N 5/332* (2013.01)

(58) Field of Classification Search
    CPC .. H04N 5/2252; H04N 5/2253; H04N 5/2254; H04N 5/2251; H04N 5/332; H04N 5/2256
    USPC .................................................. 348/373–375
    See application file for complete search history.

(56) References Cited

U.S. PATENT DOCUMENTS

| | | |
|---|---|---|
| 9,228,731 B2 | 1/2016 | Chen |
| 2007/0126872 A1 | 6/2007 | Bolotine et al. |
| 2010/0025554 A1* | 2/2010 | Foreman .......... G08B 13/19619 248/231.9 |
| 2012/0092504 A1* | 4/2012 | Murphy ................. G03B 17/02 348/159 |
| 2013/0100292 A1* | 4/2013 | Mojaver .............. H04N 5/2251 348/159 |
| 2014/0002676 A1* | 1/2014 | Ning ....................... G02B 7/14 348/187 |
| 2014/0301727 A1 | 10/2014 | Resh |
| 2015/0358538 A1* | 12/2015 | Donaldson ............ G03B 17/02 348/38 |
| 2017/0331987 A1* | 11/2017 | Kimura ................. G03B 17/55 |
| 2018/0187828 A1* | 7/2018 | Law ..................... F16M 13/022 |

FOREIGN PATENT DOCUMENTS

| | | | |
|---|---|---|---|
| CN | 104 595 752 A | 5/2015 | |
| EP | 1381002 * | 1/2004 | .......... G08B 13/196 |
| EP | 2 887 328 A1 | 6/2015 | |
| EP | 3 168 819 A1 | 5/2017 | |
| GB | 2 522 185 A | 7/2016 | |
| KR | 101 651 877 B1 | 8/2016 | |
| WO | 2004/095386 A1 | 11/2004 | |
| WO | 2008/017857 A1 | 2/2008 | |
| WO | 2013/143492 A1 | 10/2013 | |

* cited by examiner

CAMERA ARRANGEMENT FOR MOUNTING A DOME OF THE CAMERA ARRANGEMENT TO A CAMERA BASE

FIELD OF INVENTION

The present teachings relate to a camera arrangement and in particular an attachment device for mounting a dome of the camera arrangement to a camera base.

BACKGROUND

Monitoring cameras are used in many different applications, both indoors and outdoors, for monitoring a variety of environments. The monitoring cameras may be mounted to a surface, such as a wall, a ceiling, a roof or a post, by a camera base. The contents of the camera base, such as one or several camera heads and electronics therefore are protected by a translucent dome which is mounted to the camera base to encapsulate its interior. The number of camera heads and also their intended operation range may determine the overall shape of the dome. In case of one camera head only, the dome may be configured as a half-spherical dome with a constant radius between the envelope surface and the camera head, thereby not causing any undue optical disturbance caused by the dome. Also, in such configuration the camera head may be arranged to provide a 360-degree monitoring area. In case of a plurality of camera heads, each camera head may be configured to cover a narrower area by distributing the camera heads in a ring shaped pattern. In such configuration, the dome may be provided as a halved "donut" or a halved "swim ring". Such a dome is disclosed in applicant's EP-3 168 819. The shape of the dome makes it possible to tilt the camera heads at various angles such that they may be pointed anywhere between essentially horizontal and essentially vertical, without the distance to the inside of the dome changing. In this manner, it is possible to avoid optical aberrations, image distortion and disturbing lines in the images. Alternatively, the dome may have a flat bowl shape, i.e. with a similarly curved outer circumference, but with an otherwise flat surface, and a sharp "corner" between the curved part and the flat part.

No matter the shape of the dome, the dome is mounted to the camera base as a final step and is typically mounted by a plurality of connecting means such as screws which are arranged along the periphery of the dome and hence also along the periphery of the camera base. In order to protect the interior of the monitoring camera from intrusion of precipitation, humidity, dust and insects, it is essential that all interfaces between the dome and the camera base are sealed by one or several seals. Such seals may either be integrated in one or both opposing interfaces or even be handled as a separate item during mounting of the dome.

The monitoring cameras are in most cases positioned in locations in which they are not easily accessible. Also, the positions are often chosen to be at such distance from the ground that they provide a good overview of the area to be monitored, but also at such height that they cannot be interfered with by possible vandals. In some situations, the monitoring camera should also be hidden. This kind of deliberate inaccessibility does however cause problems when mounting and maintaining the camera since it requires a ladder and climbing to access the monitoring camera. Also less ergonomic working positions are required which further complicates the work. It is very common that a lot of work must be performed with the hands above the head where it is difficult to handle small connecting means such as screws and tools therefor. There is hence a need for improvements in the attachment arrangements between the dome and the camera base.

SUMMARY

It is an object of the disclosure to provide a camera arrangement comprising a dome, a camera base and an attachment device that allows a simplified mounting and dis-mounting of the dome to the camera base.

Another object is to allow the mounting and dis-mounting without the need for any tooling or connecting members.

Yet another object is to provide a camera arrangement in which the mounting, although being simplified, still ensures proper encapsulation of the interior of the camera arrangement.

These and other objects are achieved, in full or at least in part, by a camera arrangement comprising: a camera base for mounting the camera arrangement to a surface, the camera base comprising a central receiving portion; a dome comprising a central section comprising a through-going opening; and an attachment device configured to attach the dome to the central receiving portion, the attachment device comprising an attachment portion configured to extend through the through-going opening of the dome and to lockingly engage a complementary attachment portion of the central receiving portion, and an abutment portion configured to abut an outside surface of the dome.

Accordingly, the disclosure provides a camera arrangement wherein the dome may be mounted to the camera base without requiring any special tooling and without the operator having to handle a number of connecting means such as screws or the like. Instead, the dome is mounted to the camera base by the attachment device forming part of the camera arrangement and where the mounting and dis-mounting of the latter may be made by a one hand-grip. Further, by the abutment portion being configured to abut an outside surface of the dome, an effective sealing between the dome and the attachment device may be provided, that effectively may prevent intrusion of precipitation, humidity, dust and insects.

The attachment device may be configured to lockingly engage the central receiving portion by locking means formed by threads, a bayonet mount or a snap-fit. The locking means may alternatively be magnetic, or rely on a frictional engagement. In yet another embodiment, the locking means may be of the "snap-on-twist-off" type.

The attachment device may comprise a circumferential wall portion having a longitudinal extension, and wherein the locking means are arranged along an inner wall portion or along an outer wall portion of the circumferential wall portion. The inner wall portion or the outer wall portion may have a straight-linear longitudinal extension or be slightly conical. The attachment device may be formed as a unitary body with integrated locking means. Also any seal may be integrated in the attachment device.

The attachment device may have a longitudinal extension and comprise a flange having an extension transverse to the longitudinal extension, and the locking means may be arranged on an outer surface of the flange. The flange may be arranged, by way of example, in or adjacent the lower, free end of the attachment device configured to face the camera base. Alternatively, the flange may be arranged in or adjacent the upper end of the attachment device, configured to face the dome.

The camera arrangement may further comprise a seal arranged circumferentially around the through-going opening in the dome, and between either the abutment portion and the outside surface of the dome or between the central receiving portion and an inside surface of the dome. The seal prevents intrusion of precipitation, humidity, dust etc. into the interior of the camera arrangement. The seal may be loosely attached or be integrated in one of the two parts to be interconnected.

The camera arrangement may comprise a sealing surface sealing in a substantially axial direction between the dome and the abutment portion and a sealing surface sealing in a substantially radial direction between the dome and the camera base. This provides for a favourable load distribution to the dome.

The camera arrangement may further comprise a seal arranged circumferentially around an outer circumferential edge of the camera base and between the inside surface of the dome and the camera base. The seal prevents intrusion of precipitation, humidity, dust etc. into the interior of the camera arrangement. The seal may be loosely attached or be integrated in one of the two parts to be interconnected, i.e. either the dome or the camera base.

The camera arrangement may comprise one or more camera heads arranged in an interspace between the camera base and the dome, and the central receiving portion may comprise at least one socket for connecting the one or more camera heads to a network or power.

The central receiving portion and the attachment device may comprise at least one through-going opening in a wall portion thereof allowing guiding of wiring from the one or more camera heads to the at least one socket.

The attachment device may further comprise an illumination arrangement. The illumination arrangement may be arranged on an exterior surface of the attachment device, i.e. on a surface facing away from the dome and the camera base The camera arrangement may further comprise a complementary electrical coupling between the attachment device and the central receiving portion for connecting the illumination arrangement to power.

The attachment device may comprise a circumferential shielding wall arranged to prevent light from the illumination arrangement from entering the dome.

The illumination arrangement may comprise an IR illuminator. The IR illuminator may comprise a plurality of IR LEDs. The IR illuminator may be arranged to emit IR light in a spectral range of 730-1000 nm.

The dome may have a toroidal shape with a rotational symmetry along a rotational angle around a first axis of symmetry; at least an outer segment of the dome may be transparent; the outer segment may have a shape in section which is defined by a second axis of symmetry arranged at a first radius from the first axis of symmetry and orthogonal to the first axis, the outer segment having a radius of curvature over an angle around the second axis of symmetry; and the central segment may connect the outer segment with the first axis of symmetry.

The angle over which the outer segment is curved may be less than or equal to 90°, and a transition from the outer segment to the central segment may be rounded.

A further scope of applicability of the present disclosure will become apparent from the detailed description given below. However, it should be understood that the detailed description and specific examples, while indicating preferred embodiments, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

A more detailed understanding may be had from the following description, given by way of example in conjunction with the accompanying drawings where.

DETAILED DESCRIPTION

Figure 1:
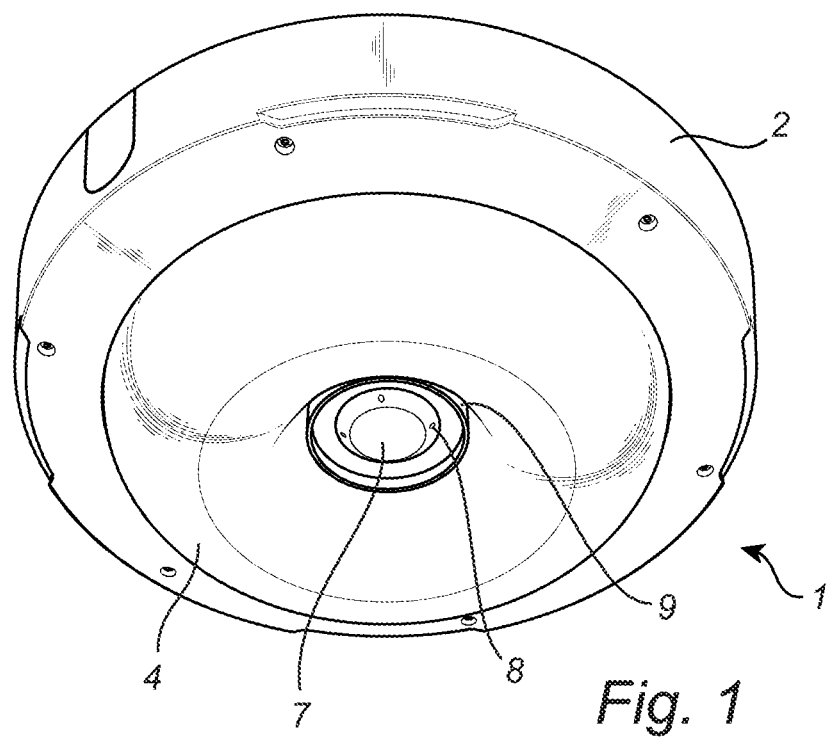
FIG. 1 is a perspective view of an embodiment of a camera arrangement.
Figure 2:
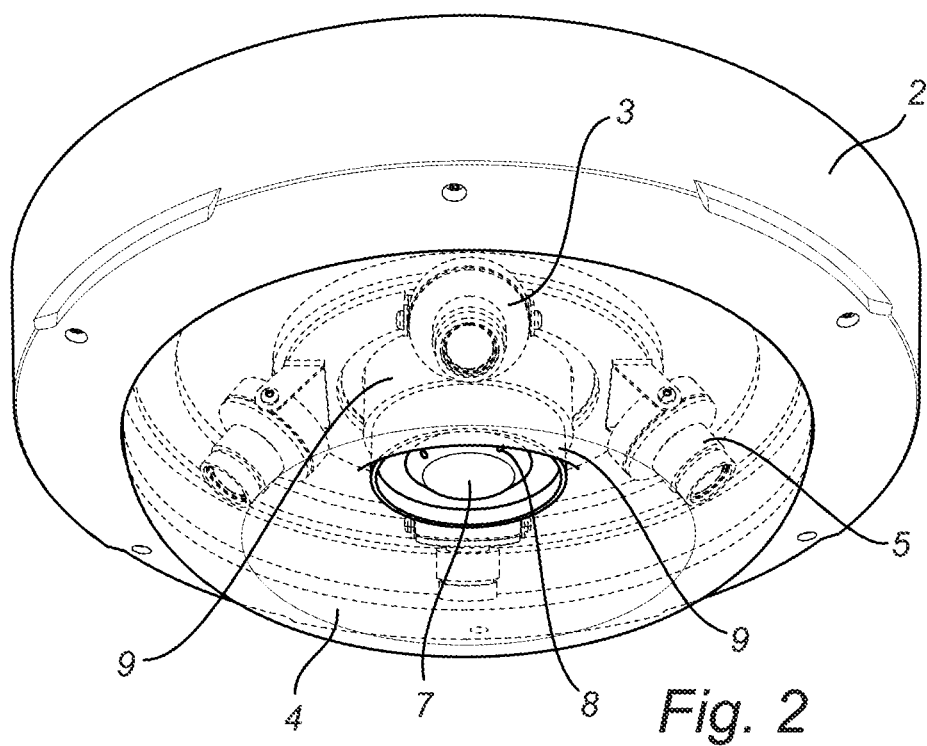
FIG. 2 is a perspective view of the camera arrangement of FIG. 1.

In FIGS. 1 and 2, a camera arrangement 1 is shown, which has a camera base 2, four camera heads 3 and a dome 4. For the sake of clarity of other details, the camera heads 3 are not visible in FIG. 1, but three of them may be seen in FIG. 2, the fourth one being obscured at the back in this view. The camera heads 3 are arranged inside the dome 4. The camera heads 3 may be mounted on holders 5 held by magnetic force on a mounting rail (not shown) as disclosed in applicant's EP-2 887 328, which is incorporated herein by reference.

Figure 3:
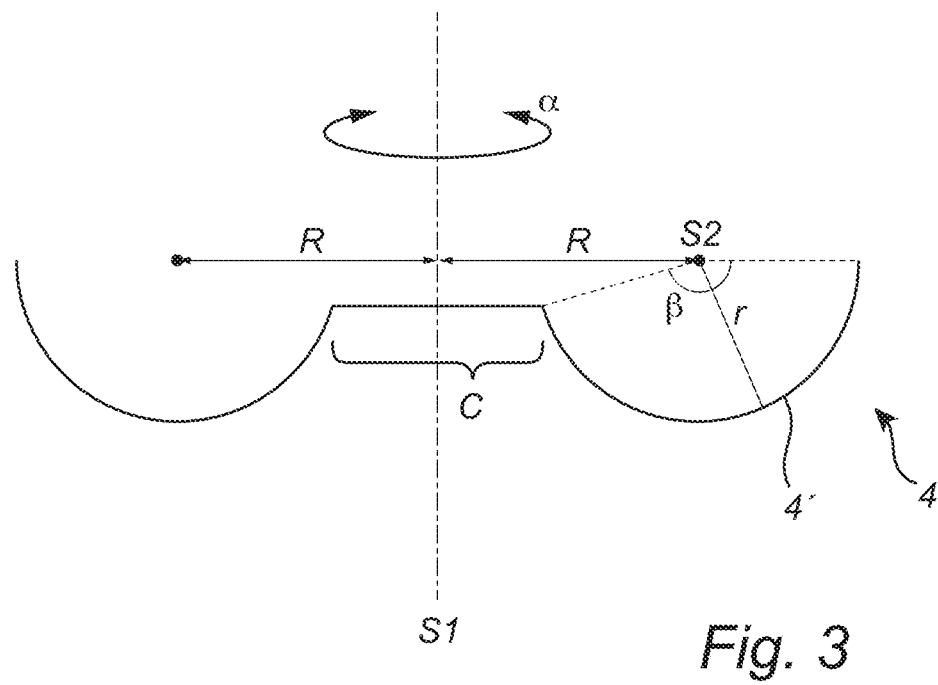
FIG. 3 is a sectional view of the dome of the camera of FIG. 1.

In FIG. 1, the dome 4 has a toroidal shape, which may be said to be a halved "donut" or a halved "swim ring", and which is shown separately in FIG. 3. Such a dome is disclosed in applicant's EP-3 168 819, which is also incorporated herein by reference. The shape of the dome may be described as being toroidal with a rotational symmetry along a rotational angle α around a first axis of symmetry S1. Further, the dome has an outer segment 4' which has a shape in section which is defined by a second axis of symmetry S2 arranged at a first radius R from the first axis of symmetry S1 and orthogonal to the first axis S1. The outer segment 4' has a radius of curvature r over an angle β around the second axis of symmetry S2. The dome 4 further comprises a central segment C connecting the outer segment 4' with the first axis of symmetry S1.

Figure 4:
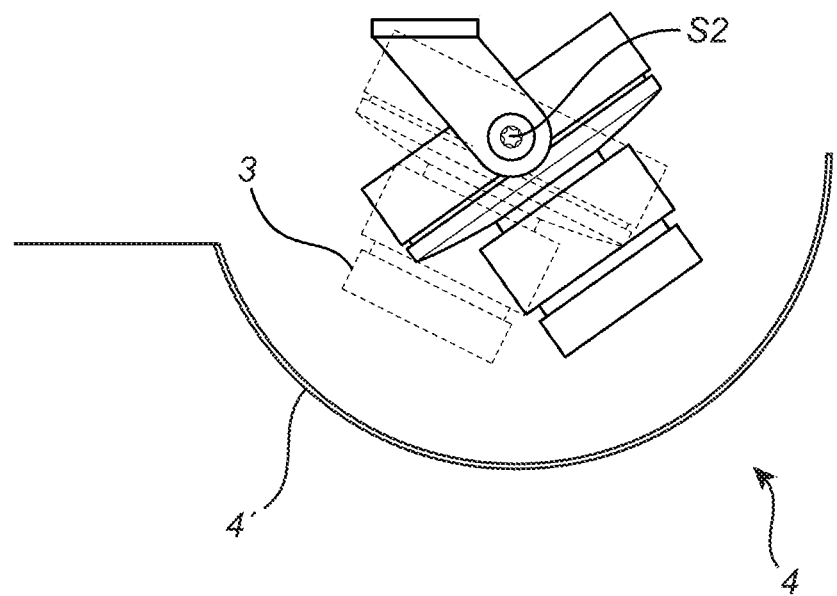
FIG. 4 is a sectional view of a detail in FIG. 3.
Figure 7:
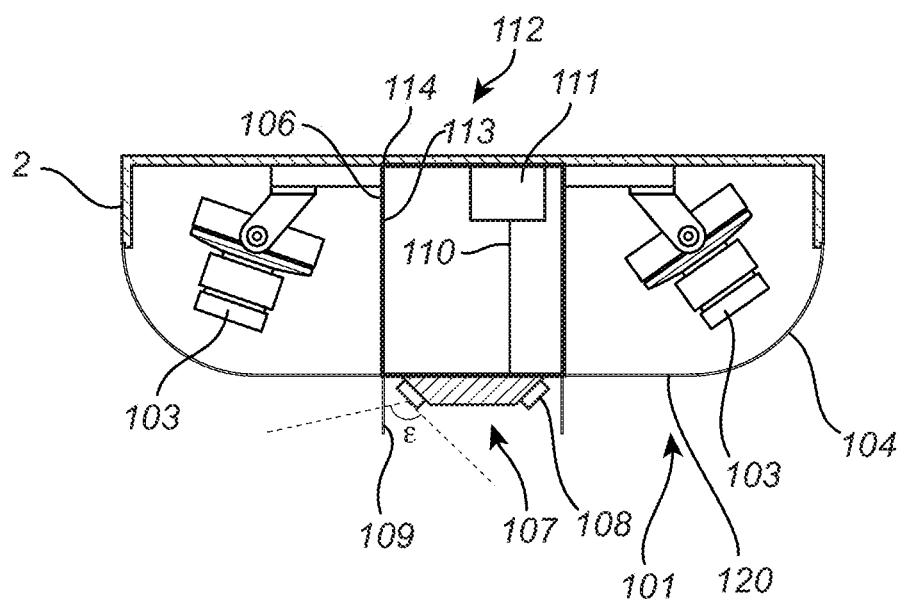
FIG. 7 is a sectional view of another embodiment of a camera arrangement.

The dome 4 is made of a transparent material, such as polycarbonate. The shape of the dome 4 makes it possible to tilt the camera heads 3 at various angles, as illustrated in FIG. 4, such that they may be pointed anywhere between essentially horizontal and essentially vertical, without the distance to the inside of the dome 4 changing. In this manner, it is possible to avoid optical aberrations, image distortion and disturbing lines in the images. For instance, if a prior art dome of a flat bowl shape, i.e. with a similarly curved outer circumference, but with an otherwise flat surface, and a sharp "corner" between the curved part and the flat part, were used, there would be a line in the images if a camera head were pointed towards the junction between the curved circumference and the flat "bottom" of the bowl-shaped dome. FIG. 7 shows an example of a camera arrangement 101 with another flat bowl-shaped dome 104, which lacks the sharp "corner" at the junction between the curved circumference and the flat "bottom", and which will be discussed in more detail further down.

Figure 5:
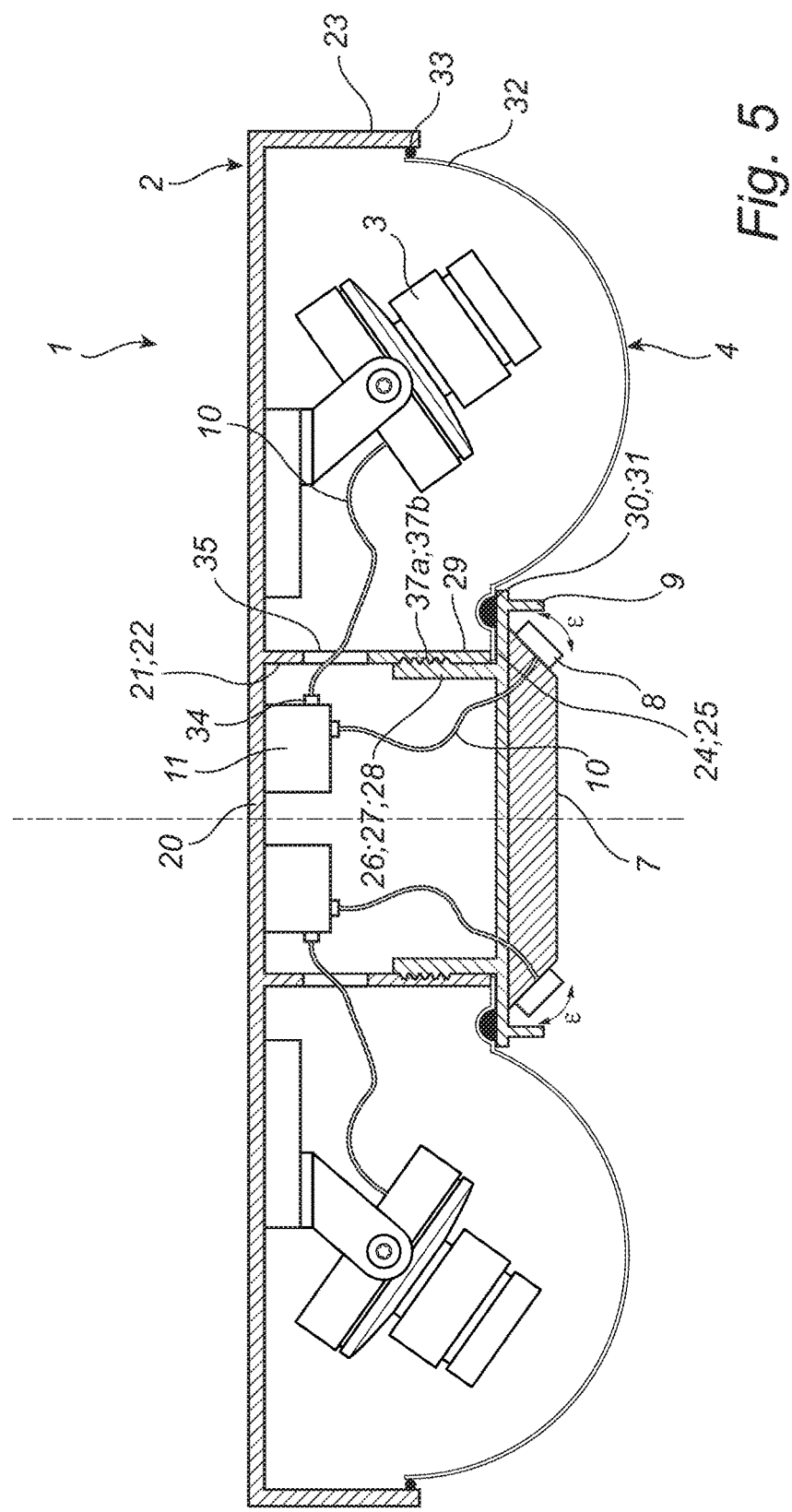
FIG. 5 is a sectional view of the camera arrangement of FIG. 1.

Now turning to FIG. 5, a schematic cross section of the camera arrangement 1 with the camera base 2 and the dome 4 is disclosed.

The camera base 2 comprises a support 20 from which a central receiving portion 21 extends. The central receiving portion 21 is formed as a sleeve which comprises a circumferential wall portion 22 having a longitudinal extension and which projects away from the support 20. The camera base 2 further comprises a circumferential peripheral edge portion 23. The camera base 2 may be formed by a plastic material and be formed in one piece or by several interconnected parts.

The dome 4 comprises a central section 24 comprising a through-going opening 25. The dome 4 is attached to the central receiving portion 21 of the camera base 2 by an attachment device 26. The attachment device 26 has the form of a sleeve 27 with an attachment portion 37a which is configured to extend through the through-going opening 25 of the dome 4 and to lockingly engage a complementary attachment portion 37b of the central receiving portion 21 of the camera base 2.

The sleeve 27 of the attachment device 26 forms a circumferential wall portion 28 having a longitudinal extension. In a condition where the attachment device 26 is attached to the central receiving portion 21, the circumferential wall portion 28 of the attachment device 26 engages the circumferential wall portion 22 of the central receiving portion 21 in an overlapping condition. The overlap can be provided by either the attachment device 26 being inserted into the circumferential wall portion 22 of the central receiving portion 21 as is disclosed in FIG. 5, or by the circumferential wall portion 22 of the central receiving portion 21 being inserted into the circumferential wall portion 28 of the attachment device 26.

The attachment device 26 is configured to lockingly engage the central receiving portion 21 by locking means 29. In the disclosed embodiment, the locking means 29 are formed by threads which are arranged along at least a portion of the longitudinal extension of the outer circumferential wall portion 28 of the attachment device 26 and along an inner circumferential wall portion 22 of the central receiving portion 21 of the camera base 2.

The attachment device 26 further comprises an abutment portion 30 which is configured to abut an outside surface of the dome 4. A seal 31 is arranged in the interface between the abutment portion 30 and the outside surface of the dome 4. The seal 31 may be integrated in either the dome 4 or in the attachment device 26. Alternatively, the seal 31 may be a separate member which is manually arranged when attaching the attachment device 26 to the camera base 2. In the disclosed embodiment the seal 31 is arranged circumferentially around the through-going opening 25 in the dome 4 and between the abutment portion 30 of the attachment device 26 and the outside surface of the dome 4. It is to be understood that other positions are possible, such as between the central receiving portion 21 and an inside surface of the dome 4.

In a position where the dome 4 is attached to the camera base 2, the peripheral edge portion 32 of the dome 4 sealingly abuts the peripheral edge portion 23 of the camera base 2. A seal 33 is arranged circumferentially around the outer circumferential peripheral edge 23 of the camera base 2 and between the outside surface of the dome 4 and the camera base 2. The seal 33 may be integrated in either the dome 4 or the camera base 2. Alternatively, the seal 33 may be a separate member which is manually arranged when attaching the dome 4 to the camera base 2 by using the attachment device 26.

The seal 31 between the attachment device 26 and the dome 4 is preferably arranged to provide a sealing surface leading to a substantially axial sealing contact between the dome 4 and the abutment portion 30. Further, the seal 33 between the dome 4 and the camera base 2 is preferably arranged to provide a sealing surface resulting in a substantially radial sealing contact. By this combination of two different sealing directions, the dome 4 is subjected to a favourable load condition reducing the risk of the dome 4 being subjected to undue tension with possible cracking.

The inner closed interspace that is defined between the came base 2 and the dome 4 comprises one or more camera heads 3. The central receiving portion 21 may comprise at least one connector or socket 34 for connecting the one or more camera heads 3 to a network or power via an electronics unit 11. To allow wiring 10 to extend from the one or more camera heads 3 to the at least one socket 34, the central receiving portion 21 comprises at least one through-going opening 35 in its circumferential wall portion 22 allowing guiding of wiring 10 from the one or more camera heads 3. Depending on the overlap between the attachment device 26 and the central receiving portion 21, also the circumferential wall portion 28 of the attachment device 26 may comprise at least one corresponding through-going opening allowing guiding of wiring 10 from the one or more camera heads 3.

Figure 6:
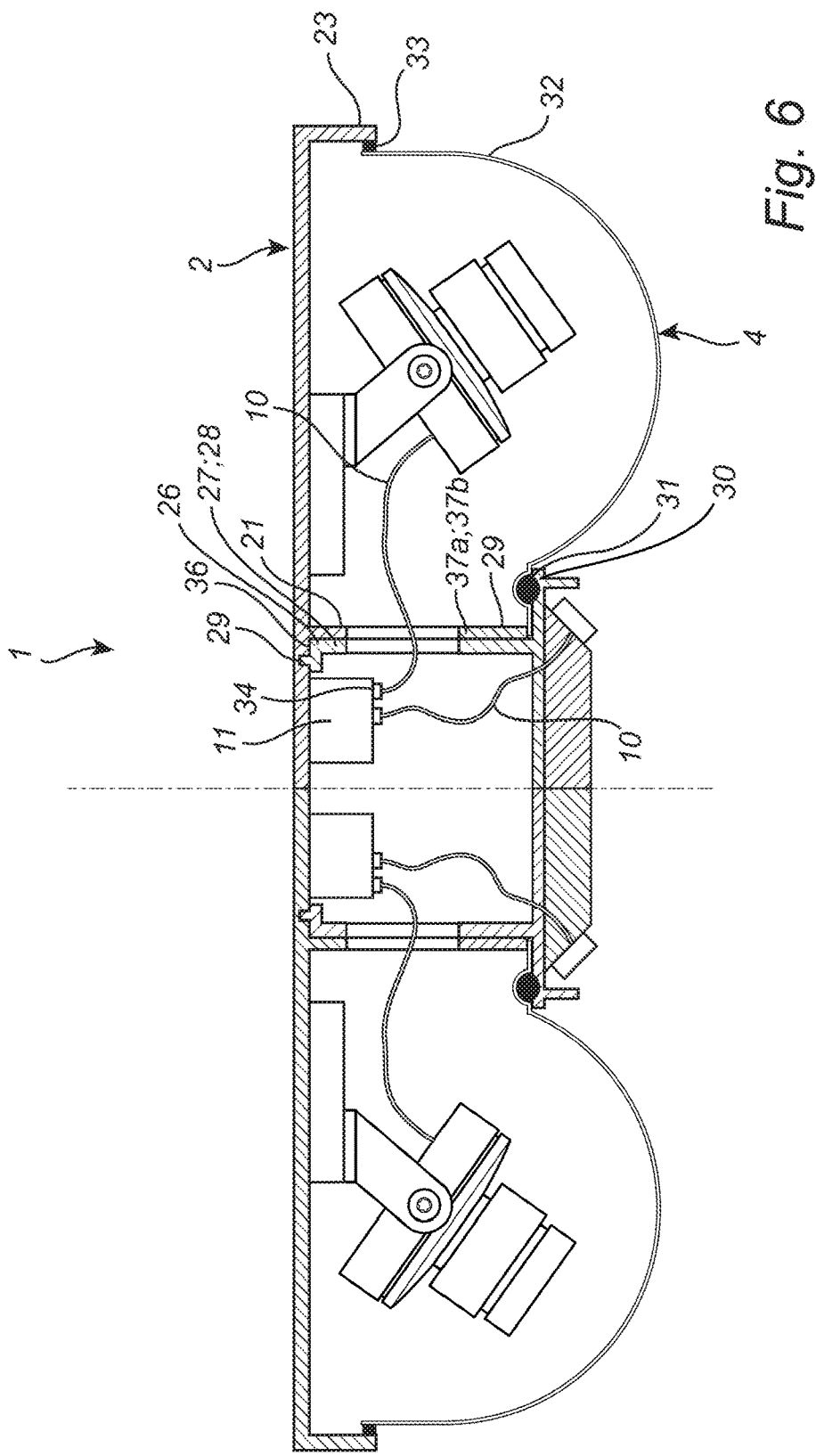
FIG. 6 is a sectional view of another embodiment of a camera arrangement.

As is illustrated in FIGS. 1, 5 and 6, the attachment device 26 comprises an illumination arrangement 7. The illumination arrangement 7 may be arranged on either the outside of the attachment device 26, i.e. on the surface facing away from the camera base 2, or on the inside of the attachment device.

The illumination arrangement 7 has a number of IR illuminators, here in the form of IR LEDs 8. The IR illuminators may be arranged to emit IR light in a spectral range of 730-1000 nm. Typical wavelength intervals for the IR illuminators reside around the range between 730 nm and about 1000 nm, for example around 730 nm, around 850 nm and around 940 nm. Of these, the 940 nm would be fully outside of the visible spectral range, while the 730 nm and the 850 nm would give a faint glow in the area of the illumination source.

Further, the illumination arrangement 7 has a circumferential shielding wall 9 arranged to prevent light from the illumination arrangement 7 from entering the dome 4. The shielding wall 9 blocks the beam path from the IR LEDs 8 into the dome 4. Thereby, even if the IR LEDs have a wide emission angle ε, it may be ensured that light is not emitted directly into the dome 4, where it could be reflected on the inside of the dome 4 and create stray light, or even partly or completely blind the image sensor. In the embodiment shown in FIG. 1, the illumination arrangement has five IR LEDs 8, each emitting light in an angle ε of approximately 90°. The IR LEDs 8 may thereby provide light all around the camera arrangement 1. The IR LEDs are arranged on a generally conical surface, such that they emit light mainly away from the camera heads 3 inside the dome 4.

Wiring 10 to the IR LEDs 8 extends from the electronics unit 11 in the camera base 2 through the attachment device 26. The wiring 10 is thereby well protected and needs to take only a short route from the electronics unit 11 to the illumination arrangement 7. The wiring 10 may be used for powering the illumination arrangement 7 and also for controlling it. For instance, the camera arrangement 1 may control the illumination arrangement 7 to be turned on when it is determined that there is too little light in the scene.

As an alternative to using wiring 10 for connecting the illumination arrangement 7 to power, a non-disclosed complementary electrical coupling may be arranged between the attachment device 26 and the central receiving portion 21. As a non-limiting example such complementary electrical coupling may be provided as electrically conductive paths (not disclosed) integrated in the material of the attachment device 26 and the camera base 2. The integration may be made during molding. The conductive paths are preferably arranged to extend along the central receiving portion 21 and the central circumferential wall portion 28 of the attachment device 26 to the electronics unit 11.

When mounting the dome 4 to the camera base 2, the dome 4 is placed on the camera base 2, and the sleeve 27 of the attachment device 26 is inserted in the central receiving portion 21 of the dome 4. The attachment device 26 is then rotated until the locking means 29 of the attachment device 26 lockingly engages the complementary locking means 29 of the central receiving portion 21, thereby locking the attachment device 26 with the illumination arrangement 7 and dome 4 in place on the camera base 2. In this manner, it is possible to forego any cover ring that is usually arranged around the dome 4 for connecting the dome 4 to the camera base 2 using a number of screws. Such a cover ring is actually shown in FIGS. 1 and 2, but could accordingly be dispensed with. The camera arrangement 1 may thereby be made more compact, with a smaller outer diameter. The attachment device 26 also reduces the number of separate parts needed for mounting the dome 4 on the camera base 2. Further, the risk that an installer drops one or more screws for fastening the dome 4 is eliminated.

Now turning to FIG. 6, an alternative design of the attachment device 26 is schematically disclosed. The attachment device 26 has the form of a sleeve 27 with a circumferential wall 28 having a longitudinal extension. The distal end of the attachment device 26 configured to face away from the dome 4 comprises a flange 36 having an extension transverse the longitudinal extension. The flange 36 may project inwardly as disclosed, or outwardly.

Locking means 29 configured to attach the attachment device 26 to the central receiving portion 21 of the camera base 2 are arranged on an outer surface of the flange 36. The locking means 29 may by way of example be in the form of a snap-fit or a bayonet mount.

A circumferential seal 31 is arranged in the interface between the attachment device 26 and the dome 4. The seal 31 is preferably arranged to provide a substantially axially directed sealing contact between the dome 4 and the abutment portion 30. Also, a seal 33 between the peripheral edge 23 of the camera base 2 and the peripheral edge 32 of the dome 4 is arranged to provide a substantially radially directed sealing contact.

It will be appreciated that a person skilled in the art can modify the above described embodiments in many ways and still use the advantages of the disclosure as shown in the embodiments above.

The locking means 29 have been described as threads. It is however to be understood that the locking means alternatively may be formed by a bayonet mount or a snap-fit. The locking means may alternatively be magnetic, or rely on a frictional engagement. In yet another embodiment, the locking means may be of a "snap-on-twist-off" type.

A "snap-on-twist-off" type locking means 29 is in the context of the disclosure to be understood as a locking means in which the two portions to be interlocked, in this case the attachment device and the camera base, lockingly engage each other by a snap-fit. The snap-fit is achieved by moving the attachment device towards the camera base in the axial direction. During this axial movement, a flexible tongue in the attachment device is temporarily compressed into a radially acting locking engagement with a wall portion of the camera base. A dis-engagement is provided by rotating the attachment device in view of the camera base, whereby the flexible tongue will be guided along the wall portion of the camera base until a radially extending through-going opening in the side wall is reached allowing the tongue to fully release its compression in the radial direction. In this position the attachment device may be removed in the axial direction away from the camera base.

In case of the locking means being threads, it is to be understood that the number of threads may be altered as long as a secure engagement is provided between the camera base and the attachment device. The number of revolutions may be less than one.

In case of the locking means 29 relying on frictional engagement, the abutting attachment portions 37*a*, 37*b* of the attachment device 26 and the central receiving portion 21 may be straight-linear with more or less the same cross-section thereby allowing a grip-fit.

In case of the locking means 29 relying on magnetic engagement, one or several magnets and complementary metallic surfaces may be arranged along e.g. the attachment portions 37*a*, 37*b* of the attachment device 26 and the central receiving portion 21 respectively, or along the flange 36 of the attachment device 26 and around the central receiving portion 21.

The illumination arrangement 7 has been described as a number of IR LEDs. It would be possible to have, instead, an illumination arrangement with a visible light illuminator, e.g., using white LEDs or other light sources. It would also be possible to combine IR and visible light illuminators. A visible light illuminator may, apart from providing light necessary for capturing images, draw attention to the camera arrangement. This may for instance be utilised for making a person turn towards the camera arrangement, such that good images of the person's face may be obtained.

In the embodiment shown in the drawings, the camera arrangement 1 has four camera heads 3. Still, it is entirely possible to utilise the disclosed teachings also for camera arrangements with more or fewer camera heads 3.

The dome has been described as being made of polycarbonate. Other transparent materials may be used instead, such as acrylic (PMMA) or glass. Further, the base has been described as being made of plastic, but may instead be made of, e.g., metal, such as cast aluminium.

The sealing directions of the seals between the dome and the abutment portion, and the dome and the housing, respectively, may be switched compared to what has been described above, such that the sealing contact between the dome and the abutment portion is radial and the sealing contact between the dome and the housing is axial. Depending on the choice of material for the dome, the sealing directions may be more or less important for distributing loads.

Now turning to FIG. 7 another embodiment of a camera arrangement 101 is shown. In FIG. 7, the same reference numerals are used as in the previous figures, but with the addition of 100. The camera arrangement 101 has a camera base 102, four camera heads 103, and a flat bowl-shaped dome 104. In this embodiment, the allowable tilt angle range for the camera heads 103 may possibly be smaller than for the camera heads 3 in the embodiment shown in FIG. 1, as the transition where the outer segment 104' meets the flat part 120 of the dome 104 may introduce slight distortions in captured images if the camera heads 103 are pointed straight downwards. Still, the smooth transition from the rounded outer segment 104' to the flat portion 120 would not introduce an annoying line in the images, as would the prior art flat bowl-shaped dome discussed above, in which there is a sharp "corner" between the rounded outer segment and the flat "bottom". In the same manner as discussed in connection with FIG. 1, an illumination arrangement 107 is arranged at a centre of the dome 104. The camera arrangement 101 differs from the one shown in FIG. 1 only with respect to the shape of the dome, and therefore the description of the illumination arrangement will not be repeated here, nor will the attachment device.

Other dome shapes are also feasible. For instance, if the camera heads 3 inside the dome 4 are fixed in position and tilt angle, the dome 4 could be provided with a flat portion in front of each camera head. Further, if the camera heads are fixed in position, but pannable and tiltable, a "bubble" could be formed in the dome in front of each camera head.

In FIG. 1, the illumination arrangement 7 has five IR LEDs 8, each emitting light in an angle of approximately 90°. Other numbers of IR LEDs could be used, with other emission angles, for obtaining the desired illumination.

The illumination arrangement 7 on the outside of the dome 4 of the camera arrangement 1 may be combined with other devices, such as other sensors. It would also be possible to use the same concept for arranging only other devices on the camera arrangement, even if no illumination arrangement is included. For example, another sensor, such as a PIR sensor or another camera head may be arranged on the outside of the dome, in the same manner as described above for the illumination arrangement.

The attachment device 26 could be used without illuminators or any other devices arranged. In such case, the illumination arrangement could be replaced with just a flat surface.

The camera heads 3 have been disclosed as requiring wiring to be powered. It is to be understood that they with remained function may be battery driven.

Thus, the teachings should not be limited to the shown embodiments but should only be defined by the appended claims.

What is claimed is:

1. A camera arrangement comprising:
   a camera base for mounting the camera arrangement to a surface, the camera base comprising a central receiving portion;
   a dome comprising a central section comprising a through-going opening; and
   an attachment device configured to attach the dome to the central receiving portion, the attachment device comprising:
   an attachment portion configured to extend through the through-going opening of the dome and to lockingly engage a complementary attachment portion of the central receiving portion; and
   an abutment portion configured to abut an outside surface of the dome.

2. The camera arrangement according to claim 1, wherein the attachment device is configured to lockingly engage the central receiving portion by locking means formed by threads, a bayonet mount or a snap-fit.

3. The camera arrangement according to claim 2, wherein the attachment device comprises a circumferential wall portion having a longitudinal extension, and wherein the locking means are arranged along an inner wall portion or along an outer wall portion of the circumferential wall portion.

4. The camera arrangement according to claim 2, wherein the attachment device has a longitudinal extension and comprises a flange having an extension transverse the longitudinal extension, and wherein the locking means are arranged on an outer surface of the flange.

5. The camera arrangement according to claim 1, further comprising a seal arranged circumferentially around the through-going opening in the dome, and between either the abutment portion and the outside surface of the dome or between the central receiving portion and an inside surface of the dome.

6. The camera arrangement according to claim 1, comprising a sealing surface providing a substantially axial sealing contact between the dome and the abutment portion and a sealing surface providing a substantially radial sealing contact between the dome and the camera base.

7. The camera arrangement according to claim 1, further comprising a seal arranged circumferentially around an outer circumferential edge of the camera base and between the inside surface of the dome and the camera base.

8. The camera arrangement according to claim 1, wherein the camera arrangement comprises one or more camera heads arranged in an interspace between the camera base and the dome, and wherein the central receiving portion comprises at least one socket for connecting the one or more camera heads to a network or power.

9. The camera arrangement according to claim 1, wherein the central receiving portion and the attachment device comprises at least one through-going opening in a wall portion thereof allowing guiding of wiring from the one or more camera heads to the at least one socket.

10. The camera arrangement according to claim 1, wherein the attachment device further comprises an illumination arrangement.

11. The camera arrangement according to claim 10, further comprising a complementary electrical coupling between the attachment device and the central receiving portion for connecting the illumination arrangement to power.

12. The camera arrangement according to claim 10, wherein the attachment device comprises a circumferential shielding wall arranged to prevent light from the illumination arrangement from entering the dome.

13. The camera arrangement according to claim 1, wherein the illumination arrangement comprises an IR illuminator.

14. The camera arrangement according to claim 1, wherein:
   the dome has a toroidal shape with a rotational symmetry along a rotational angle α around a first axis of symmetry, at least an outer segment of the dome is transparent;

the outer segment has a shape in section which is defined by a second axis of symmetry arranged at a first radius from the first axis of symmetry and orthogonal to the first axis, the outer segment having a radius of curvature over an angle $\beta$ around the second axis of symmetry; and wherein the central segment connects the outer segment with the first axis of symmetry.

15. The camera arrangement according to claim 14, wherein the angle over which the outer segment is curved is less than or equal to 90°, and wherein a transition from the outer segment to the central segment is rounded.

* * * * *